(12) United States Patent
Thomas (10) Patent No.: US 7,828,388 B2
(45) Date of Patent: Nov. 9, 2010

(54) CRUSHABLE ARMREST ASSEMBLY

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 290 days.

(21) Appl. No.: 11/952,255

(22) Filed: Dec. 7, 2007

(65) Prior Publication Data

US 2009/0146480 A1 Jun. 11, 2009

(51) Int. Cl.
*B60N 3/02* (2006.01)
(52) U.S. Cl. .............................. 297/411.21; 297/216.1; 297/411.2; 297/411.45; 296/153; 296/187.05; 296/1.09; 296/146.7
(58) Field of Classification Search .............. 297/216.1, 297/411.2, 422.21, 411.45; 296/187.05, 296/1.09, 146.7
See application file for complete search history.

(56) References Cited

U.S. PATENT DOCUMENTS

| | | | | |
|---|---|---|---|---|
| 3,362,749 | A | * | 1/1968 | Clement ................. 297/411.21 |
| 3,387,881 | A | * | 6/1968 | Stepanek et al. ............ 296/153 |
| 3,400,979 | A | * | 9/1968 | James .................... 297/411.21 |
| 3,620,566 | A | * | 11/1971 | Leconte ...................... 296/153 |
| 4,783,114 | A | * | 11/1988 | Welch ......................... 296/153 |
| 5,181,759 | A | * | 1/1993 | Doolittle .................... 296/153 |
| 5,290,087 | A | * | 3/1994 | Spykerman ................. 296/153 |
| 5,445,430 | A | * | 8/1995 | Nichols ....................... 296/153 |
| 5,527,084 | A | * | 6/1996 | Scherf ........................ 296/153 |
| 5,951,094 | A | * | 9/1999 | Konishi et al. .............. 296/153 |
| 6,568,743 | B1 | * | 5/2003 | Jayasuriya et al. .......... 296/153 |
| 6,893,077 | B1 | * | 5/2005 | DeJongh ................ 296/187.05 |
| 6,983,967 | B2 | * | 1/2006 | Scheidmantal et al. ..... 296/1.09 |
| 7,121,611 | B2 | * | 10/2006 | Hirotani et al. .......... 296/146.7 |
| 7,387,326 | B2 | * | 6/2008 | Osada ........................ 296/39.1 |
| 7,503,621 | B2 | * | 3/2009 | Mani ..................... 296/187.05 |

* cited by examiner

*Primary Examiner*—Laurie K Cranmer
(74) *Attorney, Agent, or Firm*—Quinn Law Group, PLLC

(57) ABSTRACT

An armrest for use with a motorized vehicle is provided comprising first and second substantially opposing surfaces elongated longitudinally along the vehicle's interior surface and extending laterally inward therefrom. The armrest also includes a substantially vertical wall portion extending from the inner periphery of the first and second surfaces. The first and second surfaces define a plurality of channels oriented substantially parallel to one another and elongated longitudinally relative to the vehicle, in either a parallel or oblique fashion relative to a longitudinal axis of the vehicle. The plurality of channels is configured to sustain substantial vertical loading and controllably deform under a predetermined threshold lateral crush load. In addition, the plurality of channels preferably includes one or more partitions within each of the channels that are oriented relative to one another to thereby create a load path for lateral loads imparted to the armrest assembly.

20 Claims, 5 Drawing Sheets

CRUSHABLE ARMREST ASSEMBLY

TECHNICAL FIELD

The present invention relates generally to passenger compartments of motorized vehicles, and more specifically to armrest assemblies located in the passenger compartment that are adapted to absorb and attenuate kinetic energy imparted thereto.

BACKGROUND OF THE INVENTION

Most motorized vehicles include an armrest that extends from the interior surface of each vehicle door. The armrest is typically part of a decorative trim assembly on the inner panel of the door assembly, and is often integrated with a door latch release lever and/or a pull handle used to open and close the door assembly. The majority of conventional armrest assemblies are self-contained units that are adapted to be positively attached to the inner panel by, for example, fasteners or screws. The armrest is intended, in part, to provide a surface on which a vehicle occupant seated adjacent the door may rest the lower extremities of his or her arm.

Armrests are often relatively rigid and structurally robust in order to withstand horizontal and vertical loads applied during everyday use of the vehicle. However, the deformability of the armrest and, correspondingly, the armrest's ability to absorb kinetic energy is diminished as the rigidity of the armrest is increased. In contrast, the armrest may be constructed using softer materials so that it will yield or deform under the force of impact with a foreign or local object, such as may occur when the vehicle is struck on its side by another vehicle or slides sideways into a stationary object. However, the resiliency and durability of the armrest assembly for normal use may diminish with an overly compliant construction. Ideally, the armrest should deform in a manner to absorb a majority of the impact energy imparted thereto, while maintaining a sufficiently resilient configuration for everyday use purposes.

SUMMARY OF THE INVENTION

An energy-absorbing, crushable armrest assembly for use in a motorized vehicle is provided offering improved crush performance and more uniform kinetic energy absorption. The crushable armrest assemblies disclosed herein are designed to offer significant isolation and attenuation of lateral crush loads imparted thereto, while maintaining sufficient structural rigidity in the horizontal and vertical directions for normal usage loading. The preferred embodiments disclosed herein also provide for manipulation and control of the crush characteristics of the armrest assembly.

According to one embodiment of the present invention, an armrest assembly is provided for use in a motorized vehicle having a vehicle interior surface. The armrest assembly includes first and second substantially opposing surfaces extending inward from and elongated longitudinally along the vehicle interior surface. The first and second surfaces define a first plurality of channels therebetween that are oriented substantially parallel to one another, and elongated longitudinally relative to the vehicle, preferably in a substantially parallel or oblique fashion relative to a longitudinal axis of the vehicle. The first plurality of channels is operatively configured to sustain vertical loading sufficient for normal usage, and to controllably deform at a predetermined threshold lateral crush load.

The armrest assembly preferably also includes third and fourth substantially opposing surfaces extending inward from and elongated longitudinally along the vehicle interior surface. The third and fourth surfaces define a second plurality of channels therebetween that are elongated longitudinally relative to the vehicle and oriented substantially parallel to one another. The second plurality of channels is operatively configured to sustain vertical loading sufficient for normal usage, and to controllably deform at the predetermined threshold lateral crush load.

A substantially vertical wall portion preferably extends from the inner periphery of the first and second surfaces. The substantially vertical wall portion preferably defines a third plurality of channels that are elongated longitudinally relative to the vehicle and oriented substantially parallel to one another. Synonymous to the first and second pluralities of channels, the third plurality of channels is operatively configured to sustain vertical loading sufficient for normal usage, and to controllably deform at the predetermined threshold lateral crush load.

It is further preferred that the armrest assembly also includes a pull-handle feature laterally inboard relative to the vehicle interior surface. Alternatively, the armrest assembly includes a pull-cup portion laterally inboard relative to the vehicle interior surface, wherein the first plurality of channels extend through the pull-cup portion. The pull-cup portion can take on various geometric configurations, including, but not limited to, a bathtub configuration, and include various additional structural features, such as first and second longitudinally opposing concave spherical end portions. In regard to the latter, each concave spherical end is configured to flex inward when a lateral compressive force is imparted to the pull-cup portion. In addition, each concave spherical end is also configured to flex outward when a lateral tensile force is imparted to the pull-cup portion and thereby engage with an end portion of a respective channel that is immediately adjacent thereto to limit any outward flexure of the concave spherical end.

It is also preferred that the armrest assembly includes an upper skin layer oriented vertically proximate to the first surface and operatively configured to cover the first plurality of channels. In a similar regard, the armrest assembly may also include a foam layer, such as foam padding or injected foam filling, that is configured to fill the first plurality of channels, cover a substantial portion of the first plurality of channels, fill a void space within the arm rest assembly, or any combination thereof.

Ideally, the first and second surfaces further define a switch plate portion within the first plurality of channels. Accordingly, the switch plate portion functions in a manner synonymous to the first plurality of channels—i.e., the switch plate portion is configured to sustain substantial vertical loading and controllably deform at the predetermined threshold lateral crush load. The switch plate portion includes one or more apertures that are each configured to operatively receive a respective switch. To this regard, the switch plate portion is preferably also configured to connect with a substantially flat face plate member that defines at least one switch slot configured to mate with each switch.

The crush characteristics of the armrest assembly described above can be manipulated and controlled through the inclusion of certain structural modifiers. By way of example, the first and second surfaces may further define a plurality of apertures therethrough. The apertures are oriented in a manner to selectively weaken the armrest assembly at preselected points. In a similar regard, one or both of the first and second surfaces can further define a plurality of grooves along and substantially parallel to each of the channels to selectively weaken the armrest assembly along predetermined locations. As another example, the armrest assembly preferably also includes one or more substantially vertical protuberances that project laterally outward from the second surface, preferably between two adjacent channels. The protuberances are configured to induce fracture of a respective channel immediately adjacent thereto upon contact therebetween. According to yet another example, the first plurality of channels preferably includes one or more substantially vertical partitions within each of the channels. The vertical partitions are oriented relative to one another to create a load path for lateral loads imparted to the armrest assembly. As a final example, the substantially vertical wall portion preferably includes a plurality of indentations or slots oriented to weaken the armrest assembly at preselected locations to thereby provide predetermined crush characteristics.

According to another embodiment of the present invention, a door assembly is provided that is secured, hinged, or attached to the body of a motorized vehicle to selectively transition from a closed position to an open position. The door assembly includes an interior panel substantially opposing an exterior panel, and a pull-handle feature oriented laterally inboard relative to the interior panel. First, second, third and fourth surfaces are elongated longitudinally along the interior panel, and extend inward therefrom. The first and second surfaces define a first plurality of channels therebetween that are oriented substantially parallel to one another, and elongated longitudinally relative to the vehicle. Similarly, the third and fourth surfaces define a second plurality of channels therebetween that are oriented substantially parallel to one another, and elongated longitudinally relative to the vehicle. A substantially vertical wall portion extends from the inner periphery of the first and second surfaces, and includes a plurality of indentations or slots that are configured to weaken the door assembly at preselected locations to thereby provide predetermined crush characteristics. The first plurality of channels includes at least one substantially vertical partition within each of the channels. The vertical partitions are oriented relative to one another to thereby create a load path for lateral loads imparted to the door assembly.

According to an additional embodiment of the present invention, a motorized vehicle is provided having a vehicle body with opposing interior and exterior surfaces. The motorized vehicle includes an armrest assembly having first and second substantially opposing surfaces elongated longitudinally along the interior surface and extending inward therefrom. The first surface also defines a pull-cup portion oriented laterally inboard relative to the vehicle interior surface. The first and second surfaces define a first plurality of channels therebetween that are oriented substantially parallel to one another, and elongated longitudinally relative to the vehicle. A substantially vertical wall portion extends from the inner periphery of the first and second surfaces, and includes a plurality of indentations or slots that are configured to weaken the armrest assembly at preselected locations to thereby provide predetermined crush characteristics. The substantially vertical wall portion also defines a second plurality of channels that are elongated longitudinally relative to the vehicle and oriented substantially parallel to one another. The first and second pluralities of channels are each operatively configured to sustain vertical loading sufficient for normal usage, and to controllably deform at a predetermined threshold lateral crush load.

The above features and advantages, and other features and advantages of the present invention, will be readily apparent from the following detailed description of the preferred embodiments and best modes for carrying out the present invention when taken in connection with the accompanying drawings.

DESCRIPTION OF THE PREFERRED EMBODIMENTS

Figure 1:
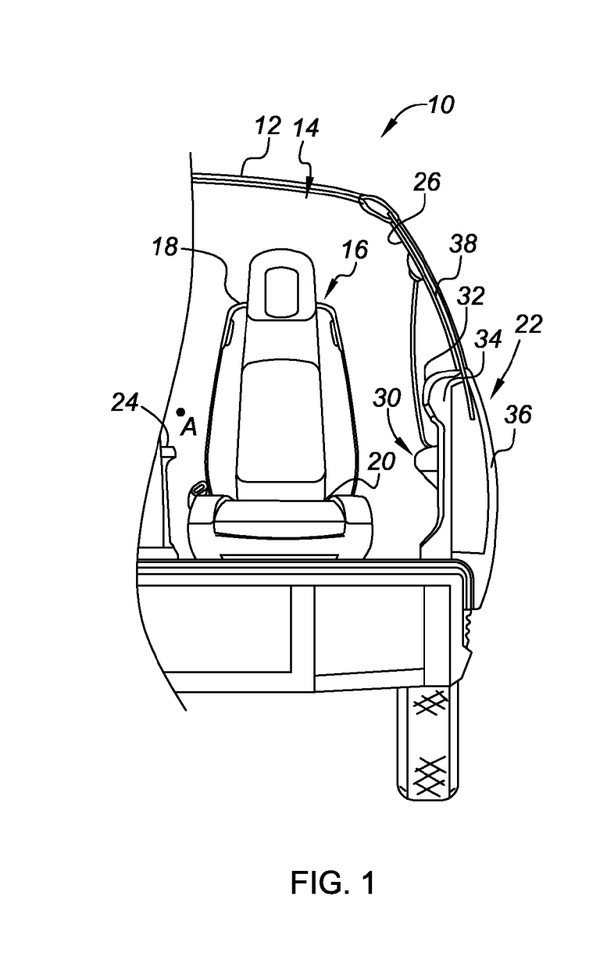
FIG. 1 is a front cross-sectional view of a portion of a representative motorized vehicle in which a crushable armrest assembly in accordance with the present invention may be practiced.

Referring to the drawings, wherein like reference numbers refer to the same or similar components throughout the several views, FIG. 1 is a front cross-sectional view of a portion of a representative motorized vehicle, identified generally as 10, with which the present invention may be practiced. The vehicle 10 has a vehicle body 12 including a vehicle interior, shown in part in FIG. 1 as passenger compartment 14, having one or more vehicle seat assemblies 16 therein. The seat assembly 16 can be of any suitable or conventional construction, but generally includes a backrest unit 18 and a lower cushion portion 20. Although the vehicle 10 is depicted in FIG. 1 as a standard coupe-type passenger car, the present invention can be incorporated into any vehicle platform, such as, but not limited to, sedan-type passenger cars, light trucks, heavy duty vehicles, minivans, buses, convertibles, etc. The vehicle body 12 has a longitudinal axis A, as best seen in FIGS. 2A and 3A, that extends along the length of the vehicle body 12.

In accordance with this invention, the vehicle 10 includes at least one energy-absorbing, crushable armrest assembly 30 (also referred to herein as "armrest" or "armrest assembly") that is preferably mounted to a vehicle door assembly 22, but may also be mounted directly to a vehicle seat assembly 16, to a console 24 located within the passenger compartment 14, to an interior panel or substrate, represented in FIG. 1 by vehicle interior surface 26, or any combination thereof. The vehicle door assembly 22 is operatively secured to the vehicle body 12 in a manner sufficient to allow the vehicle door assembly 22 to transition from a closed position (as shown in FIG. 1) to an open position (not shown), e.g., via hinges or by a mechanical or automated track-and-sled mechanism (not depicted herein).

Figure 2A:
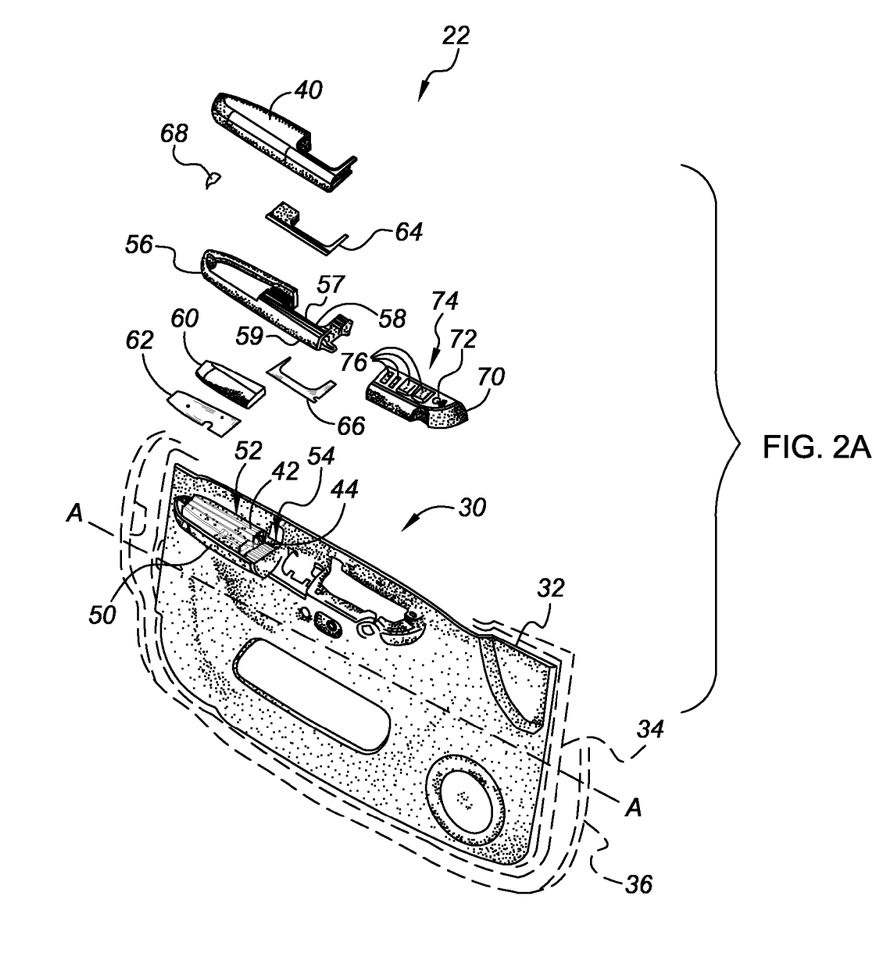
FIG. 2A is an exploded perspective view of the exemplary vehicle door assembly of FIG. 1 with a crushable armrest assembly in accordance with one embodiment of the present invention mounted thereto.
Figure 3A:
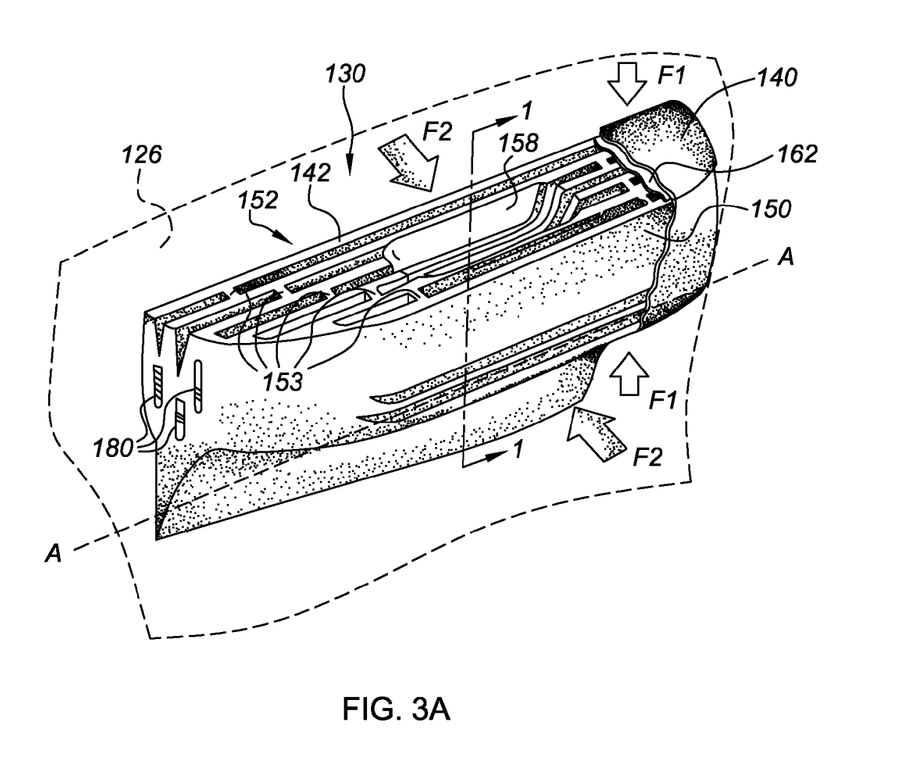
FIG. 3A is a perspective view of a crushable armrest assembly in accordance with another embodiment of the present invention illustrated herein as attached to an exemplary vehicle interior surface.

Looking at both FIGS. 1 and 2A now, the vehicle door assembly 22 also includes a door trim assembly 32 mounted to a door interior panel or wall 34 adjacent the passenger compartment 14. The door interior panel 34 is secured to a reinforcing subassembly (not shown), e.g., by welding, clinching, or otherwise mechanically fastening portions of the panel to the door reinforcing assembly, to oppose a door exterior panel or wall 36—i.e., the interior panel 34 is substantially parallel to and inboard from the door exterior panel 36, to thereby operatively house a power window pane 38 therebetween. The inner and outer door panels 34 and 36, respectively, are preferably manufactured from a material known to have a suitable strength for the intended use of the vehicle door assembly 22, such as a rigid plastic polymer (e.g., Polymethyl methacrylate or PMMA, or bulk mold compound or BMC), a metallic material (e.g., cold rolled steel, hot dipped galvanized steel, stainless steel, aluminum, and the like), or a combination thereof, and may be finished with an anti-corrosive, highly durable coating (e.g., zinc plating). The door inner panel 34 can be covered by a foam material or padding (not shown), followed by the door trim assembly 32, which in turn is preferably covered, for example, by a decorative cloth, leather, or vinyl.

The armrest assembly 30 is preferably of sufficient length and width to provide support for most of the forearm (e.g., from the elbow to the wrist) of a vehicle occupant (not shown) immediately adjacent the door assembly 22. The armrest assembly 30 is preferably fabricated from a material typical for armrests. For example, the armrest 30 is preferably made from a plastic composite, and is covered, as will be discussed below, by a foam material or padding and concealed with a decorative cloth, leather, vinyl, or plastic (not shown).

Figure 2B:
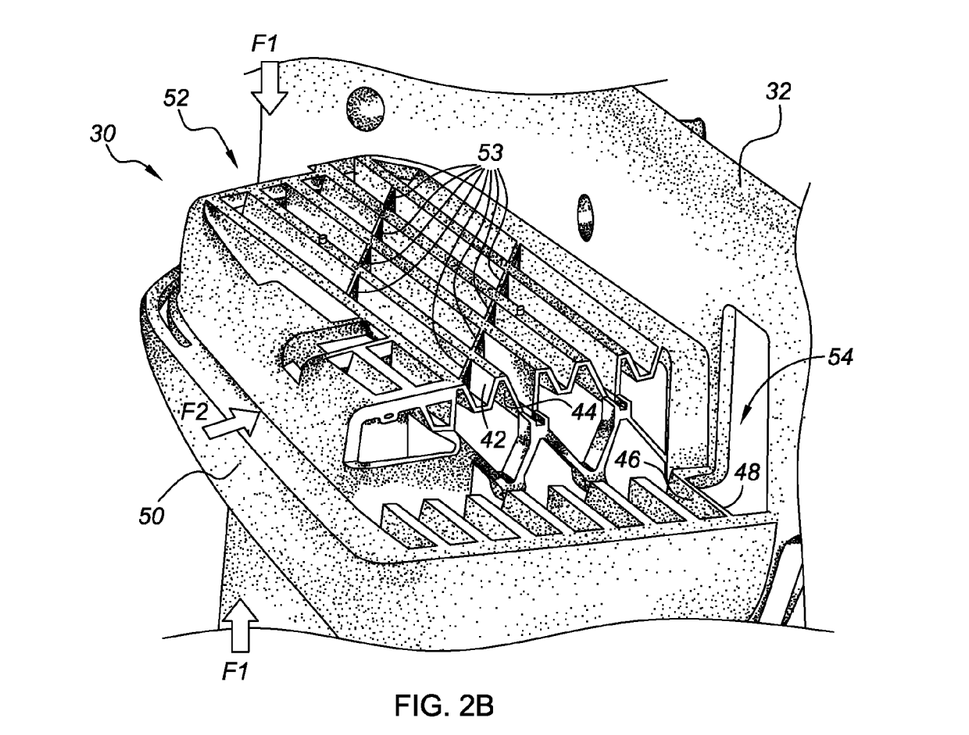
FIG. 2B is an enlarged perspective view of a portion of the crushable armrest assembly of FIG. 2A.

With reference to FIG. 2B, the crushable armrest assembly 30 includes a plurality of substantially opposing surfaces, depicted collectively herein as first, second, third and fourth surfaces 42, 44, 46 and 48, respectively, elongated longitudinally along and extending inward from the door interior panel 34. A substantially vertical wall portion 50 extends from the inner periphery of the first and second surfaces 42, 44. The first and second surfaces 42, 44 define a first plurality of channels 52, each having a plurality of ridges and valleys and oriented substantially parallel to one another. Similarly, the third and fourth surfaces 46, 48 define a second plurality of channels 54, each having a plurality of ridges and valleys and oriented substantially parallel to one another. The first and second pluralities of channels 52, 54 are each elongated longitudinally relative to the vehicle body 12, preferably in either a parallel or oblique fashion relative to the longitudinal axis A of the vehicle, i.e., vehicle 10 of FIG. 1. As such, the first and second pluralities of channels 52, 54 are each operatively configured to sustain significant vertical loading (depicted in FIG. 2B for illustrative purposes by arrows F1), and to controllably deform at or above a predetermined threshold lateral crush load (depicted in FIG. 2B for explanatory purposes by arrow F2). For example, the first and second pluralities of channels 52, 54 provide sufficient structural rigidity for normal loading purposes, i.e., to maintain approximately 250 to 500 Newtons (N) vertical loading and 300 N horizontal loading, but will controllably deform under atypical loading scenarios, i.e., at or above a 2000N lateral crush force.

As shown in FIG. 2B, the first plurality of channels 52 preferably includes one or more generally vertical partitions 53 within each of the individual channels. The vertical partitions 53 are oriented relative to one another to create a predetermined load path for lateral loads, e.g., lateral crush load F2, imparted to the armrest assembly 30. More specifically, the path (or spatial vector) of a lateral crush load F2 is redirected by the partitions 53 and, thus, redistributed throughout the armrest assembly 30, which allows for more controlled and uniform attenuation of the lateral crush load F2 by the armrest assembly 30. Although not shown herein, the vertical partitions 53 can also be incorporated into an arm-rest pull cup or pull handle feature (shown in FIGS. 2D and 6-8) to manage lateral inboard loads created when a vehicle occupant pulls the door shut, transmitting those loads in an angular direction within the armrest assembly 30. The vertical partitions 53 can be of a single material thickness or can alternately be of a channel construction. Also of note, the aspect ratio between the length of the channel and the width can change within a design. In general, it is preferable for the length of the channel to be greater than its width. Although not shown herein, the second plurality of channels 54 may also include vertical partitions.

Turning back to FIG. 2A, an exploded perspective view of the vehicle door assembly 22 and corresponding armrest assembly 30 of FIG. 1 is illustrated therein. The armrest assembly 30 includes an armrest substrate 56 having a pull-handle feature 58, which, once assembled to the door trim assembly 32, is oriented laterally inboard relative to the door inner panel 34 and, thus, the vehicle interior surface 26 in a substantially flush-fit manner with respect to the first surface 42. As will be described in further detail hereinbelow with respect to FIG. 2D, the armrest substrate 56 of FIG. 2A is configured to receive and mate with an armrest cushion or foam piece 60. The foam piece 60 is preferably fabricated from a compliant material, such as, but not limited to, molded polyurethane, soy foam, and the like, and can take on various additional geometries and can be attached using various additional means without departing from the scope of the claimed invention.

Ideally, there is a substantially flat, thin upper skin layer 62 oriented vertically proximate to the first surface 42. The upper skin layer 62 is preferably dimensioned to, at a minimum, cover the first plurality of channels 52, and is fabricated from a material that is sufficient to minimize detection of the channels 52 by a user (not shown) of the crushable armrest assembly 30. In a similar respect, first and second substantially flat, thin closeout pieces 64 and 66, respectively, are placed along upper and lower faces 57 and 59, respectively, of the pull-handle feature 58, to function in a manner similar to the upper skin layer 62. Finally, a third closeout piece 68 of similar thickness and material to the first and second closeout pieces 64, 66 is disposed vertically proximate to a longitudinal edge of the upper face 57. Once all of the closeout pieces, i.e., first, second and third closeout pieces 64, 66 and 68, are properly positioned along their respective surfaces, an outer skin or A-surface 40 is thereafter mated with the armrest substrate 56, providing an aesthetically appealing and functional surface for opening and closing the door assembly 22. As an optional intermediate step, a foam layer can be utilized under the A-surface 40 (not shown herein).

A trim panel electrical switch assembly (or "switch pack") of the type for actuating various vehicle electrical components is shown at 70 in FIG. 2A. The switch pack 70 has a continuous upper surface 72 covering a switch array 74 including a plurality of electrical switches 76. The electrical switches 76 can be configured, for example, for opening and closing windows, such as power window pane 38 of FIG. 1, for locking and unlocking doors, such as vehicle door assembly 22 of FIG. 1, and for selecting and manipulating either a left- or right-side rearview mirror (not shown) for adjustment.

Figure 2C:
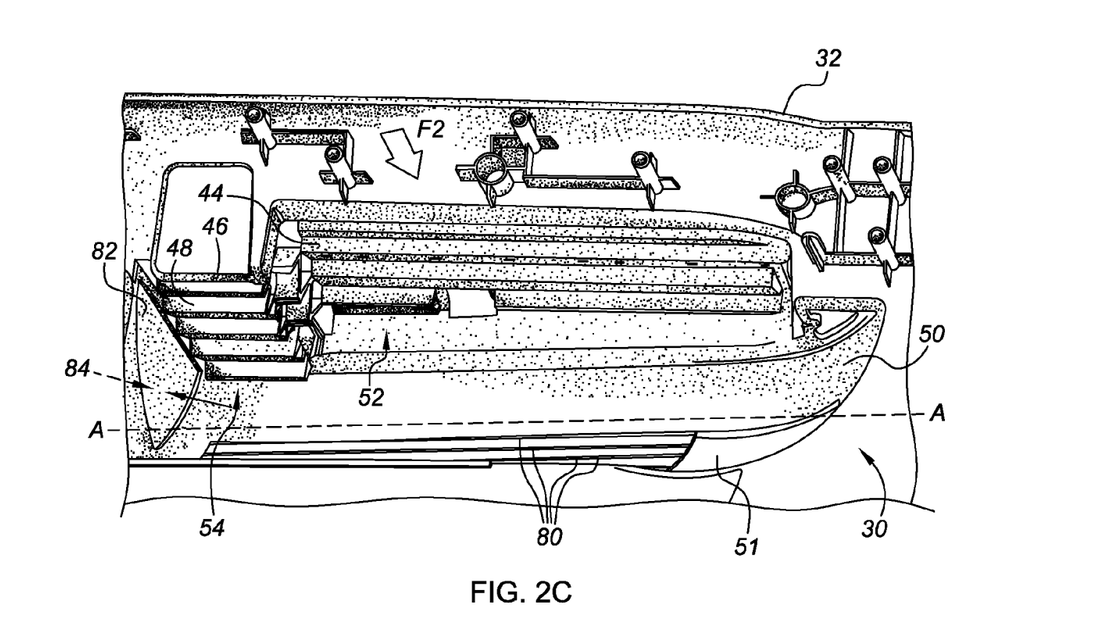
FIG. 2C is a rear perspective view of the door trim assembly from FIG. 2A, illustrating certain preselected locations of the armrest assembly that are strategically weakened to provide predetermined crush characteristics.

An inboard-looking perspective view of the door trim assembly 32 from FIGS. 1 and 2A is provided in FIG. 2C to illustrate certain preselected locations of the armrest assembly 30 that are strategically weakened to provide predetermined crush characteristics. A plurality of weakening indentations, ridges, or slots 80 are elongated along a lower involute portion 51 of the substantially vertical wall portion 50, substantially parallel relative to the longitudinal axis A of the vehicle body 12. The weakening slots 80 are configured to weaken the armrest assembly 30 in a direction substantially perpendicular to the longitudinal axis A of the vehicle body 12 to thereby provide predetermined crush characteristics. By way of example, when a lateral crush load F2 is imparted to the armrest assembly 30, the weakening slots 80 will deform and/or collapse more readily than portions of the armrest assembly 30 without any weakening slots 80, allowing for controlled distribution and more significant attenuation of the lateral crush load F2. In a similar respect, one or more substantially vertical and flat transverse wall portions 82 of the armrest assembly 30 that are substantially perpendicular to the longitudinal axis A of the vehicle body 12 are preferably manufactured with a reduced cross-sectional thickness 84. Accordingly, when a lateral crush load F2 is imparted to the armrest assembly 30, the transverse wall portions 82 will deform and/or fail more readily than portions of the armrest assembly 30 without a reduced thickness, such as thickness 84, allowing for controlled distribution and more significant attenuation of the lateral crush load F2.

Figure 2D:
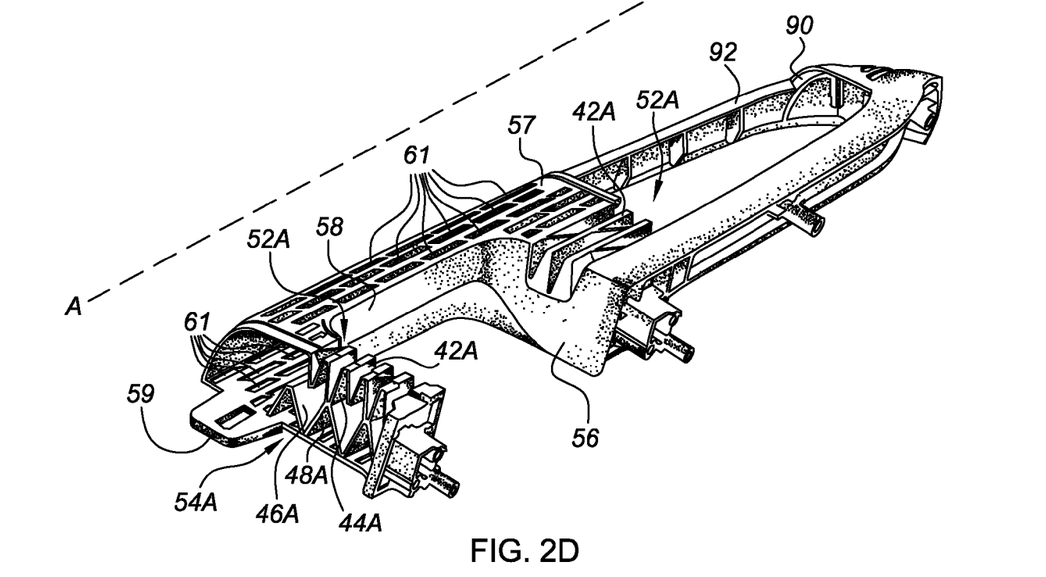
FIG. 2D is a rear perspective view of the armrest substrate with pull-handle feature of FIG. 2A.

Turning to FIG. 2D, a rear perspective view of the armrest substrate 56 with pull-handle feature 58 of FIG. 2A is provided. The upper and lower faces 57 and 59 each define a plurality of ducts 61 therethrough that are oriented substantially parallel to one another, and elongated in a substantially parallel fashion relative to the longitudinal axis A (FIG. 2A) of the vehicle body 12. The armrest substrate 56 is also designed to include a cushion receiving port 90 that is contoured to receive and mate with an armrest cushion, such as foam piece 60 of FIG. 2A. The foam piece abuts against a landing surface 92 to fit in a substantially flush-fit manner with respect to the upper face 57.

The armrest substrate 56 is preferably manufactured from a material known to have a suitable strength for the intended use of the vehicle door assembly 22, such as a rigid plastic polymer (e.g., PMMA or BMC), a metallic material (e.g., aluminum), or a combination thereof, and may be finished with an anti-corrosive, highly durable coating (e.g., zinc plating).

The armrest substrate 56 also includes a plurality of substantially opposing surfaces, depicted collectively herein as first, second, third and fourth substrate surfaces 42A-48A, respectively, elongated longitudinally along and extending inward from the door interior panel 34. Similar to the first and second surfaces 42, 44 of FIG. 2B, the first and second substrate surfaces 42A, 44A of FIG. 2D define a first plurality of substrate channels 52A therebetween that are oriented substantially parallel to one another. To boot, the third and fourth substrate surfaces 46A, 48A, acting in a functionally synonymous manner to the third and fourth surfaces 46 and 48 of FIG. 2B, define a second plurality of substrate channels 54A therebetween. As such, the first and second pluralities of channels 52A, 54A are each elongated longitudinally relative to the vehicle body 12, preferably in either a parallel or oblique fashion relative to the longitudinal axis A of the vehicle 10 (FIG. 1).

An energy-absorbing, crushable armrest assembly 130 (also referred to herein as "armrest" or "armrest assembly") in accordance with an alternate embodiment of the present invention is illustrated in FIG. 3A as attached to an exemplary vehicle interior surface 126. The vehicle interior surface 126 can be any of an A- or B-surface, such as vehicle interior surface 26 of FIG. 1, or a vehicle frame cross-beam and the like (not shown). Notably, the embodiment depicted in FIGS. 3A-3B, like FIGS. 2A-2D, is not to scale and is shown herein purely for clarification purposes. Accordingly, the particular dimensions and applications provided in the drawings presented herein are not to be considered limiting.

Figure 3B:
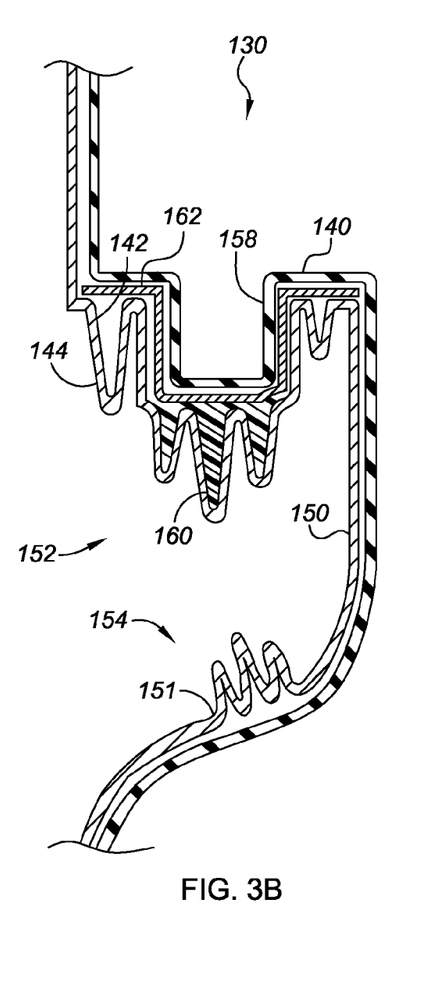
FIG. 3B is a front cross-sectional view taken along line 1-1 of FIG. 3A.

Looking at both FIGS. 3A and 3B, the crushable armrest assembly 130 includes a first surface 142 substantially opposing a second surface 144 (shown in FIG. 3B), both elongated longitudinally along the vehicle interior surface 126 and extending laterally inward therefrom. A substantially vertical wall portion 150 extends from the inner periphery of the first and second surfaces 142, 144. Similar to the first and second surfaces 42, 44 of FIG. 2A, the first and second surfaces 142, 144 of the embodiment presented in FIG. 3A define a first plurality of channels 152 therebetween, each forming a series of ridges and valleys and oriented substantially parallel to one another. The first plurality of channels 152 is elongated, preferably in either a parallel or oblique fashion, relative to a longitudinal axis A of the vehicle, i.e., vehicle 10 of FIG. 1. As such, the first plurality of channels 152 is configured to sustain significant vertical loading (portrayed in FIG. 3A for by arrows F1) sufficient for normal usage, and to controllably deform at or above a predetermined threshold lateral crush load (depicted in FIG. 2A by arrows F2). For example, the channels 152 provide sufficient structural rigidity for normal loading purposes, i.e., to maintain approximately 250 to 500 Newtons (N) vertical loading and 300N horizontal loading, but will controllably deform under atypical loading scenarios, i.e., at or above a 1000N lateral crush force.

The substantially vertical wall portion 150 defines a second plurality of channels 154 along a lower involute portion 151 and oriented substantially parallel to one another. The second plurality of channels 154 is elongated in a substantially parallel fashion relative to the longitudinal axis A of the vehicle, i.e., vehicle body 12 of FIG. 1. As such, the second plurality of channels 154 is configured to sustain significant vertical loading (e.g., vertical load F1) sufficient for normal usage, and to controllably deform at or above a predetermined threshold lateral crush load (e.g., lateral load F2).

The first plurality of channels 152 preferably includes one or more generally vertical partitions 153 within each of the individual channels. The vertical partitions 153 are oriented relative to one another to create a predetermined load path for lateral loads, e.g., lateral crush load F2, imparted to the armrest assembly 130. More specifically, the path of a lateral crush load F2 (or spatial vector) is redirected and, thus, redistributed by the partitions 153, allowing for more controlled and uniform attenuation of the lateral crush load F2 by the armrest assembly 130. These vertical partitions 153 can also manage lateral inboard loads from the arm-rest pull handle (not shown) or pull cup 158 as the vehicle occupant pulls the door shut and can transmit those loads in an angular direction within the armrest assembly 130. The vertical partitions 153 can be of a single material thickness or can alternately be of a channel construction. The aspect ratio between the length of the channel and the width can change within a design. In general, it is preferable for the length of the channel to be greater than its width.

The armrest assembly 130 is preferably of sufficient length and width to provide support for most of the forearm (e.g., from the elbow to the wrist) of a vehicle occupant (not shown) immediately adjacent thereto. The armrest assembly 130 is preferably fabricated from a material typical for armrests. For example, the armrest 130 is preferably fabricated from a plastic, and is covered by a substantially flat, thin upper skin layer 162, oriented vertically proximate to the first surface 142. The upper skin layer 162 is preferably dimensioned to, at a minimum, cover the first plurality of channels 152, and is fabricated from a material that is sufficient to minimize detection of the channels 152 by a user of the crushable armrest assembly 130. After the upper skin layer 162 is properly positioned along the first surface 142, an outer skin 140 is thereafter mated with the armrest assembly 130, providing an aesthetically appealing and functional surface for opening and closing the door assembly 22, e.g., a decorative cloth, leather, vinyl, or plastic. Optionally, a layer of foam material may be utilized between the upper skin layer 162 and the first surface 142. Finally, as seen in FIG. 3B, a compressible, energy-absorbing foam material 160, such as polyurethane foam, polystyrene foam, other similar materials, or any combination of such materials, may be utilized to fill the channels 152. This foam can also be configured to fill a small space above the arm rest assembly 130 and the outer skin 140.

The substantially vertical wall portion 150 of FIG. 3A also includes a plurality of vertically oriented weakening indentations or slots 180, substantially parallel relative to the longitudinal axis A of the vehicle, i.e., vehicle body 12 of FIG. 1. The weakening slots 180 are configured to weaken the armrest assembly 130 in a direction substantially normal to the longitudinal axis A to thereby provide predetermined crush characteristics. By way of example, when a lateral crush load F2 is imparted to the armrest assembly 130, the weakening slots 180 will deform and/or collapse more readily than portions of the armrest assembly 130 without any weakening slots 180, allowing for controlled distribution and more significant attenuation of the lateral crush load F2.

Figure 6:
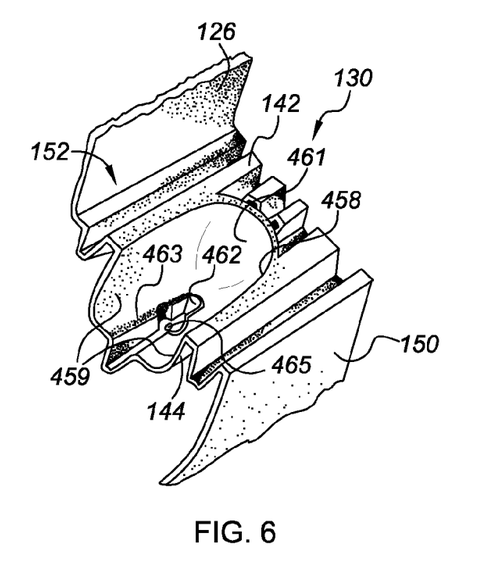
FIG. 6 is an elevated perspective view of a crushable armrest assembly in accordance with yet another embodiment of the present invention partially broken away to illustrate a pull-cup portion with one possible geometric configuration.
Figure 7:
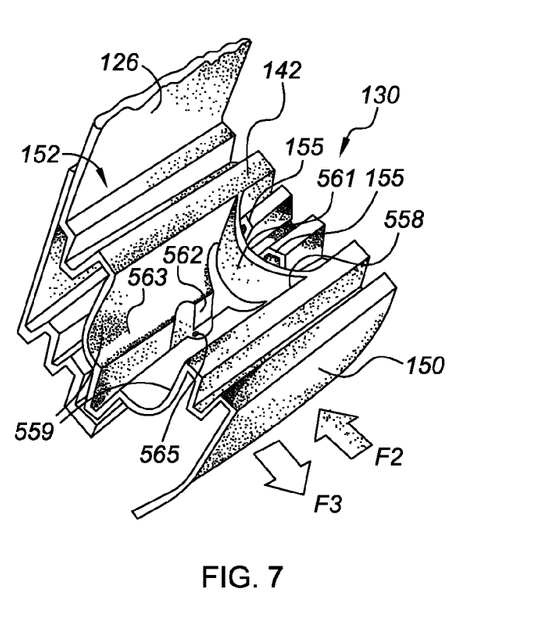
FIG. 7 is an elevated perspective view of a crushable armrest assembly in accordance with yet another embodiment of the present invention partially broken away to illustrate a pull-cup portion with another possible geometric configuration.

Looking now to FIG. 3A, the armrest assembly 130 includes a pull-cup portion 158 oriented laterally inboard relative to the vehicle interior surface 126. In this embodiment, the channels continue from first surface 142 into the pull cup portion 158. As can be seen in FIGS. 6-7, each providing a perspective view of variations of the crushable armrest assembly 130 of FIG. 3A, the pull-cup portion 158 can take on additional various geometric configurations. For example, as seen in FIG. 6, the crushable armrest assembly 130 can include a pull-cup portion 458 having a bathtub configuration. To be more specific, the pull-cup portion 458 of FIG. 6 is defined by the first surface 142, including laterally opposed sidewalls 459, longitudinally opposed semi-circular end portions 461 (only one of which is visible in FIG. 6), and a recessed base 463. A channel 462 extends longitudinally down the center of the recessed base 463 and defines a fastener hole 465 for receiving a fastening element, such as a screw, bolt, or rivet (not shown.)

Alternatively, as seen in FIG. 7, the crushable armrest assembly 130 can include a pull-cup portion 558 that is defined by the first surface 142 as including laterally opposed sidewalls 559, a recessed base 563, and first and second longitudinally opposing concave spherical end portions 561 (only one of which is visible in FIG. 7). A channel 562 extends longitudinally down the center of the recessed base 563 and defines a fastener hole 565 for receiving a fastening element, such as a screw, bolt, or rivet (not shown.) The spherical end portions 561 are each configured to flex or deform inward when a lateral compressive force (e.g., lateral crush loads F2) is imparted to the pull-cup portion 558, providing additional damping capabilities. Contrastingly, the spherical end portions 561 are also configured to flex or deform outward when a lateral tensile force (provided for explanatory purposes in FIG. 7 as arrow F3) is imparted to the pull-cup portion 558, and thereby engage with a respective end portion 155 of the first plurality of channels 152 adjacent thereto to limit the aforesaid outward flexure.

Figure 4:
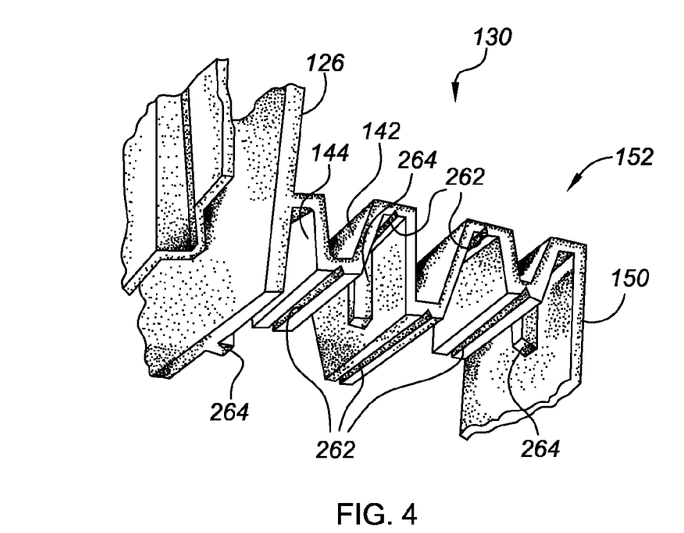
FIG. 4 is a perspective view of a portion of a crushable armrest assembly in accordance with yet another embodiment of the present invention partially broken away to illustrate certain structural modifiers that can be selectively added thereto in order to manipulate and control the crush characteristics of the armrest assembly.
Figure 5:
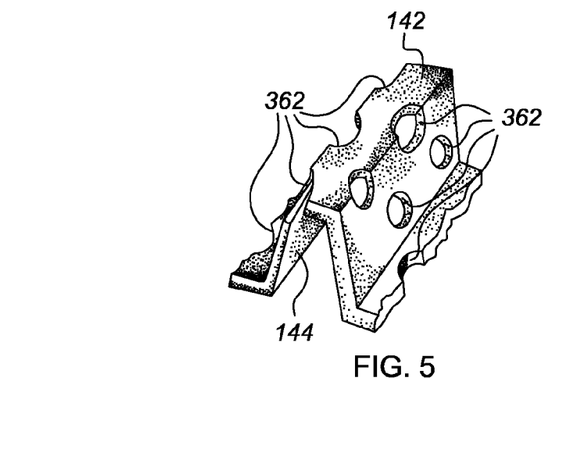
FIG. 5 is a perspective view of a portion of a crushable armrest assembly in accordance with yet another embodiment of the present invention partially broken away to illustrate a channel having a plurality of apertures therethrough to strategically weaken the armrest assembly at preselected points and thereby provide predetermined crush characteristics.

The crush characteristics of the armrest assembly 130 described above with respect to FIGS. 2A and 3A can be manipulated and controlled through the inclusion of additional structural modifiers. Although the following description is made with regard to the crushable armrest assembly 130 embodiment of FIG. 3A, the various structural modifiers described below can also be included in the embodiment presented in FIGS. 2A-2D. By way of example, with reference to FIG. 4, the first and second surfaces 142, 144 of the crushable armrest assembly 130 each preferably define a plurality of grooves 262 oriented along and substantially parallel to each of the individual channels, i.e., the first plurality of channels 152. As another example, the armrest assembly 130 preferably also includes one or more substantially vertical protuberances 264 that project laterally outward from the second surface 144, preferably between two respective channels of the first plurality of channels 152. The protuberances 264 are configured to induce fracture of a respective channel immediately adjacent thereto upon contact therebetween. The grooves 262 and protuberances 264 can be on the underside of the part (as shown) or on the top side of the part (not shown). As a final example, the first and second surfaces 142, 144 may further define a plurality of apertures 362 therethrough, oriented at certain predetermined locations in each channel of the first plurality of channels 152, as seen in FIG. 5. The apertures 362 weaken the armrest assembly 130 at preselected points to induce failure in a controlled manner.

Figure 8:
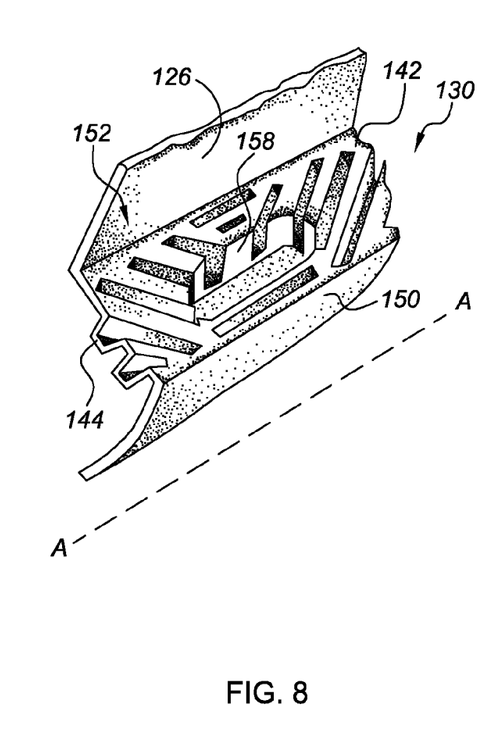
FIG. 8 is an elevated perspective view of a collapsible armrest assembly having a pull-cup portion depicting the plurality of channels elongated longitudinally in an oblique fashion relative to a longitudinal axis of the vehicle.

FIG. 8 is an elevated perspective view of the collapsible armrest assembly 130 and pull-cup portion 158 of FIG. 3A, provided to illustrate the first plurality of channels 152 elongated longitudinally in an oblique fashion relative to a longitudinal axis A of the vehicle, i.e., vehicle body 12 of FIG. 1.

Figure 9:
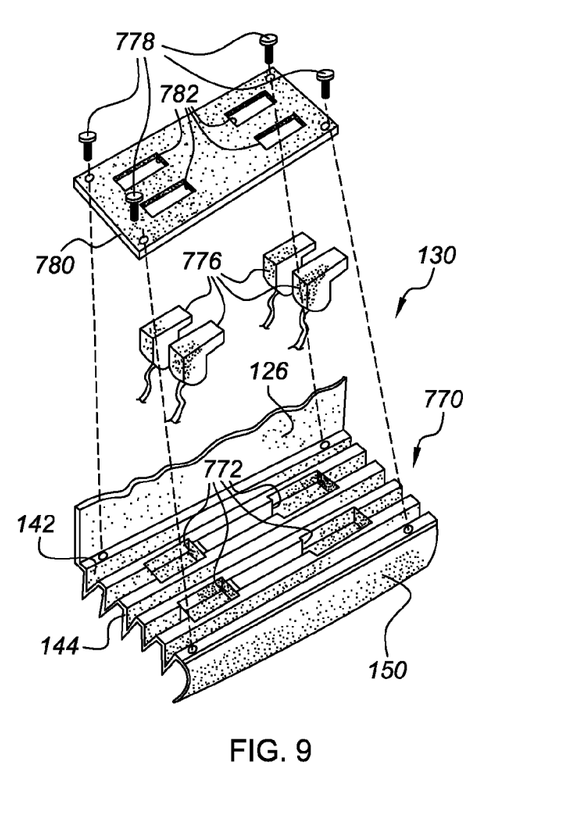
FIG. 9 is an exploded perspective view of the crushable armrest assembly of FIG. 3A having a crushable switch plate portion.

Turning then to FIG. 9, an exploded perspective view of a portion of the crushable armrest assembly 130 of FIG. 3A is provided to illustrate a crushable switch plate portion 770 within the first plurality of channels 152. More specifically, the first and second surfaces 142, 144 define at least one, but preferably four apertures 772 configured to operatively receive and house a switch array—i.e., the plurality of electrical switches 776. The switch plate portion 772 is also configured to connect (e.g., via screws 778) with a substantially flat face plate member 780 that defines a corresponding number of slots 782, each configured to mate with a respective switch 776. The electrical switches 776 can be configured, for example, for opening and closing windows, such as power window pane 38 of FIG. 1, for locking and unlocking doors, such as vehicle door assembly 22 of FIG. 1, and for selecting and manipulating either a left- or right-side rearview mirror (not shown) for adjustment.

While the best modes for carrying out the present invention have been described in detail, those familiar with the art to which this invention relates will recognize various alternative designs and embodiments for practicing the invention within the scope of the appended claims.

The invention claimed is:

1. An armrest assembly for use in a motorized vehicle having a vehicle interior surface, the armrest assembly comprising:
    first and second substantially opposing surfaces each extending inward from and elongated longitudinally along the vehicle interior surface, said first and second surfaces defining a first plurality of channels therebetween that are elongated longitudinally relative to the vehicle and oriented substantially parallel to one another;
    wherein said first surface further defines a pull-cup portion laterally inboard relative to the vehicle interior surface, and
    wherein said first plurality of channels is operatively configured to sustain vertical loading and controllably deform at a predetermined threshold lateral crush load.

2. The armrest assembly of claim 1, wherein said first plurality of channels is oriented substantially parallel or substantially oblique relative to a longitudinal axis of the vehicle.

3. The armrest assembly of claim 1, further comprising:
    third and fourth substantially opposing surfaces each extending inward from and elongated longitudinally along the vehicle interior surface, said third and fourth surfaces defining a second plurality of channels therebetween that are elongated longitudinally relative to the vehicle and oriented substantially parallel to one another;
    wherein said second plurality of channels is operatively configured to sustain vertical loading and controllably deform at said predetermined threshold lateral crush load.

4. The armrest assembly of claim 1, further comprising:
    a substantially vertical wall portion extending from a respective inner periphery of said first and second surfaces, said substantially vertical wall portion defining a second plurality of channels therebetween that are elongated longitudinally relative to the vehicle and oriented substantially parallel to one another;
    wherein said second plurality of channels is operatively configured to sustain vertical loading and controllably deform at said predetermined threshold lateral crush load.

5. The armrest assembly of claim 1, further comprising:
    a substantially vertical wall portion extending from a respective inner periphery of said first and second surfaces, wherein said substantially vertical wall portion includes a plurality of indentations or slots operatively configured to weaken the armrest assembly at preselected locations to thereby provide predetermined crush characteristics.

6. The armrest assembly of claim 1, wherein said first and second surfaces further define a plurality of apertures therethrough that are disposed at predetermined locations of said first plurality of channels.

7. The armrest assembly of claim 1, wherein at least one of said first and second surfaces further defines a plurality of grooves oriented along and substantially parallel to each of said channels, wherein said grooves are operable to selectively weaken the armrest assembly.

8. The armrest assembly of claim 1, further comprising:
    at least one generally vertical protuberance projecting laterally from said second surface, oriented between two adjacent channels of said first plurality of channels.

9. The armrest assembly of claim 1, wherein said first plurality of channels includes at least one substantially vertical partition within each of said channels, wherein said vertical partitions are oriented relative to one another to thereby create a load path for lateral loads imparted to the armrest assembly.

10. The armrest assembly of claim 1, wherein said first plurality of channels extends through said pull-cup portion.

11. The armrest assembly of claim 10, wherein said pull-cup portion has a bathtub geometric configuration.

12. The armrest assembly of claim 10, wherein said pull-cup portion has first and second longitudinally opposing concave spherical end portions that are each configured to flex inward when a lateral compressive force is imparted to said pull-cup portion and flex outward when a lateral tensile force is imparted to said pull-cup portion and thereby engage with a respective end portion of said first plurality of channels adjacent thereto and limit said outward flexure of said concave spherical end portion.

13. The armrest assembly of claim 1,
    wherein the pull-cup portion defines a pull-handle feature oriented laterally inboard relative to the vehicle interior surface.

14. The armrest assembly of claim 1, further comprising:
    an upper skin layer oriented vertically proximate to said first surface and operatively configured to cover said first plurality of channels.

15. The armrest assembly of claim 1, further comprising:
    a foam layer configured to fill one of said first plurality of channels, cover a substantial portion of said first plurality of channels, and fill a void space within the arm rest assembly, or any combination thereof.

16. The armrest assembly of claim 1, wherein said first and second surfaces further define a switch plate portion within said first plurality of channels, said switch plate portion defining at least one aperture configured to receive a respective at least one switch, wherein said switch plate portion is operatively configured to sustain vertical loading and controllably deform at said predetermined threshold lateral crush load.

17. The armrest assembly of claim 16, further comprising a substantially flat face plate member configured to mate with and attach to said switch plate portion, said face plate member defining at least one switch slot configured to mate with said at least one switch.

18. A door assembly operatively attached to the body of a motorized vehicle to selectively transition from a closed position to an open position, the door assembly comprising:
    substantially opposing interior and exterior panels;
    first and second substantially opposing surfaces each elongated longitudinally along said interior panel and extending inward therefrom, said first and second surfaces defining a first plurality of channels therebetween that are elongated longitudinally relative to the vehicle and oriented substantially parallel to one another;

third and fourth substantially opposing surfaces each elongated longitudinally along the vehicle interior surface and extending inward therefrom, said third and fourth surfaces defining a second plurality of channels therebetween that are elongated longitudinally relative to the vehicle and oriented substantially parallel to one another;

a substantially vertical wall portion extending from a respective inner periphery of said first and second surfaces, said wall portion including a plurality of indentations or slots operatively configured to weaken the door assembly at preselected locations to thereby provide predetermined crush characteristics; and a pull-handle feature oriented laterally inboard relative to the vehicle interior panel;

wherein said first plurality of channels includes at least one generally vertical partition within each of said channels, said vertical partitions oriented relative to one another to thereby create a load path for lateral loads imparted to the armrest assembly.

19. The door assembly of claim 18, wherein said first and second surfaces further define a switch plate portion within said first plurality of channels, said switch plate portion including at least one aperture configured to operatively receive a respective at least one switch, said switch plate portion being operatively configured to connect with a substantially flat face plate member that defines at least one switch slot configured to mate with said at least one switch.

20. A motorized vehicle having a vehicle body with opposing interior and exterior surfaces, comprising:

an armrest assembly including:

first and second substantially opposing surfaces each elongated longitudinally along said interior surface and extending inward therefrom, said first and second surfaces defining a first plurality of channels therebetween that are elongated longitudinally relative to the vehicle and oriented substantially parallel to one another; and a substantially vertical wall portion extending from a respective inner periphery of said first and second surfaces and including a plurality of weakening indentations or slots operatively configured to weaken the armrest assembly at preselected locations to provide predetermined crush characteristics, said substantially vertical wall portion defining a second plurality of channels that are elongated longitudinally relative to the vehicle and oriented substantially parallel to one another;

wherein said first surface further defines a pull-cup portion oriented laterally inboard relative to the vehicle interior surface; and wherein said first and second pluralities of channels are each operatively configured to sustain vertical loading and controllably deform at a predetermined threshold lateral crush load.

* * * * *